(12) United States Patent
Austen et al.

(10) Patent No.: US 8,556,502 B2
(45) Date of Patent: Oct. 15, 2013

(54) FOOD TEMPERATURE PROBE

(75) Inventors: Paul M. Austen, Milwaukie, OR (US); Rex L. Breunsbach, Clackamas, OR (US)

(73) Assignee: Electronic Controls Design, Inc., Milwaukie, OR (US)

( * ) Notice: Subject to any disclaimer, the term of this patent is extended or adjusted under 35 U.S.C. 154(b) by 94 days.

(21) Appl. No.: 13/302,969

(22) Filed: Nov. 22, 2011

(65) Prior Publication Data

US 2013/0128919 A1 May 23, 2013

(51) Int. Cl.
*G01K 3/00* (2006.01)

(52) U.S. Cl.
USPC ............................................... 374/110

(58) Field of Classification Search
USPC ............................................... 374/110
See application file for complete search history.

(56) References Cited

U.S. PATENT DOCUMENTS

| | | | |
|---|---|---|---|
| 3,778,798 A | 12/1973 | Heit | |
| 3,974,696 A | 8/1976 | Fitzmayer | |
| 4,038,510 A | 7/1977 | White | |
| 4,377,733 A | 3/1983 | Yamaguchi et al. | |
| 4,385,197 A | 5/1983 | Schwagerman | |
| 6,550,963 B2 | 4/2003 | Daily et al. | |
| 6,818,865 B2 * | 11/2004 | Mangina | 219/413 |
| 7,775,709 B2 * | 8/2010 | Biscotti et al. | 374/141 |
| 8,188,409 B2 * | 5/2012 | Baier | 219/413 |
| 2003/0007544 A1 * | 1/2003 | Chang et al. | 374/100 |
| 2006/0016806 A1 * | 1/2006 | Cristiani | 219/749 |
| 2006/0219705 A1 * | 10/2006 | Beier et al. | 219/627 |
| 2008/0043809 A1 * | 2/2008 | Herbert | 374/163 |
| 2010/0012645 A1 * | 1/2010 | Baier | 219/413 |
| 2012/0169354 A1 * | 7/2012 | Erbe et al. | 324/649 |

FOREIGN PATENT DOCUMENTS

| | | | |
|---|---|---|---|
| DE | 202005017251 U1 * | 4/2007 | |
| EP | 1271061 A2 * | 1/2003 | |
| EP | 1757862 A2 * | 2/2007 | |

* cited by examiner

*Primary Examiner* — Harshad R Patel
*Assistant Examiner* — Jamel Williams
(74) *Attorney, Agent, or Firm* — Klarquist Sparkman, LLP

(57) ABSTRACT

An exemplary embodiment of a temperature probe comprises an elongated shaft having a first portion and a second portion, the first portion being configured for insertion into a unit of food and the second portion being configured to extend outside of the unit of food. The probe further comprises at least two temperature sensors positioned at different longitudinal locations along the first portion of the shaft that are configured to measure temperatures of the unit of food at different locations within the unit of food while the unit of food is being processed thermally. The probe further comprises at least one ambient temperature sensor coupled to the shaft and configured to measure ambient temperature adjacent to the unit of food.

20 Claims, 5 Drawing Sheets

FOOD TEMPERATURE PROBE

FIELD

The present disclosure relates to a probe for measuring temperature during food preparation.

BACKGROUND

Conventional thermometers typically have a single temperature sensor and a temperature readout portion. For example, a conventional food thermometer typically comprises an elongated metal shaft that can be inserted into food with a single temperature sensor at one end and a display at the other end, such as a dial or a digital readout. While a unit of food is heating, the coolest part is typically near its center. A user will therefore often attempt to position the sensor end of a thermometer at an estimated center of the food, which may not be very accurate or repeatable. To find the coolest part of the food, the user can repeatedly insert a thermometer at different locations in the food and read the display, which can be time consuming and can damage the food. Consequently, there is a need in the art for an apparatus that can more effectively measure food temperature during a heating or cooling process.

SUMMARY

Described herein are embodiments of a temperature probe for use in thermal processing of food, such as baking bread. One exemplary embodiment of a temperature probe comprises an elongated shaft having a first portion configured for insertion into a unit of food and a second portion configured to extend outside of the unit of food. The probe further comprises at least two temperature sensors positioned at different longitudinal locations along the first portion of the shaft that are configured to measure temperature of the unit of food at different locations within the unit of food. The probe further comprises at least on ambient temperature sensor coupled to the shaft and configured to measure ambient temperature adjacent to the unit of food.

The probe can further comprise a stop coupled to the shaft between the first portion and the second portion. The stop is configured to rest on a surface of the unit of food upon insertion of the first portion of the shaft into the unit of food in order to limit further insertion of the shaft into the unit of food, thereby making locating the temperature sensors at the center of the food easier and more consistent. The stop can be adjustable along the longitudinal length of the shaft, such that a distance between the stop and the thermocouples can be adjusted.

The temperature sensors in the first portion of the shaft can be configured to measure temperature at or near a center of the unit of food. The first portion of the shaft can be configured to be positioned within the unit of food such that a middle one of the different longitudinal locations is at a slowest-heating portion of the unit of food.

The ambient temperature sensor can be thermally insulated from the shaft and the food.

An exemplary method of measuring temperature with the probe comprises: inserting a temperature probe into a unit of food; heating the unit of food with the probe inserted; and using the probe to measure at least one temperature within the unit of food and an ambient temperature adjacent to the food, while the food is heating. Inserting the probe can comprise inserting into the unit of food a portion of the probe that is distal to a stop until the stop contacts a surface of the unit of food.

Heating the unit of food can comprise moving the unit of food and the inserted probe through a plurality of different temperature zones of the oven using a conveyor, the ambient air temperature being different in the different temperature zones. The method can further comprise determining which temperature zone of the oven the unit of food is in based on the measured ambient air temperature.

Detecting at least one temperature within the unit of food can comprise measuring, with the probe, internal temperatures of the unit of food at three or more longitudinally aligned locations within the unit of food, and determining a slowest-heating location of the three or more measured locations within the unit of food.

The method can further comprise wirelessly transmitting the measured temperatures from within a heating device to a receiver outside the heating device.

Another exemplary method for measuring temperatures comprises: receiving indications of temperatures at three or more locations within a unit of food during a heating process, and simultaneously receiving an indication of an ambient temperature adjacent to the unit of food; and determining a slowest-heating location from the three or more locations within the unit of food. The slowest-heating location can be between at least two of the other locations within the unit of food.

The method can further comprise, based on the received indications: determining the temperature at the slowest-heating location at a start of the heating process; determining a time from the start of the heating process until the temperature at the slowest-heating location reaches a first predetermined temperature threshold, such as a yeast-kill temperature; determining a time from the start of the heating process until the temperature at the slowest-heating location reaches a second predetermined temperature threshold, such as a gelatinization temperature; determining a time from the start of the heating process until an end of the heating process; and/or determining a temperature at the slowest-heating location at the end of the heating process.

The foregoing and other objects, features, and advantages of the invention will become more apparent from the following detailed description, which proceeds with reference to the accompanying figures.

DETAILED DESCRIPTION

In this disclosure, the terms "a", "an" and "at least one" encompass one or more of the specified elements. That is, if two of a particular element are present, one of these elements is also present and thus "an" element is present. The phrase "and/or" means "and", "or" and both "and" and "or". Further, the term "coupled" generally means electrically, magnetically, and/or physically (e.g., mechanically or chemically) coupled or linked and does not exclude the presence of intermediate elements between the coupled or associated items absent specific contrary language. Unless specifically stated otherwise, processes and methods described herein can be performed in any order and in any combination, including with other processes and/or method acts not specifically described. The exemplary embodiments disclosed herein are only preferred examples of the invention and should not be taken as limiting the scope of the invention.

Described herein are embodiments of a temperature probe 10 that can be used to measure temperatures within a unit of food 12 as well as measure the ambient temperature adjacent to the unit of food. In an exemplary application, the unit of food 12 is a loaf of bread and the probe 10 is inserted into the loaf prior to baking and then removed from the loaf after baking. However, the probe 10 can be used with any type of food that is at least partially solid such that it can support a probe inserted into it. Further, the probe 10 can be used with any food preparation process that involves thermal processing (i.e., heating and/or cooling) of the food. Thus, while this description illustrates principles related to the probe 10 in the context of baking a loaf of bread in an oven, it should be understood that the described principles can be applied to many other applications of the probe 10 with other types of food and other forms of thermal processing. For example, the probe 10 can be used to measure temperatures associated with deep frying, boiling, defrosting, freezing, or any other food preparation process where time and temperature are critical to proper, efficient, and/or safe processing of food products.

Figure 5:
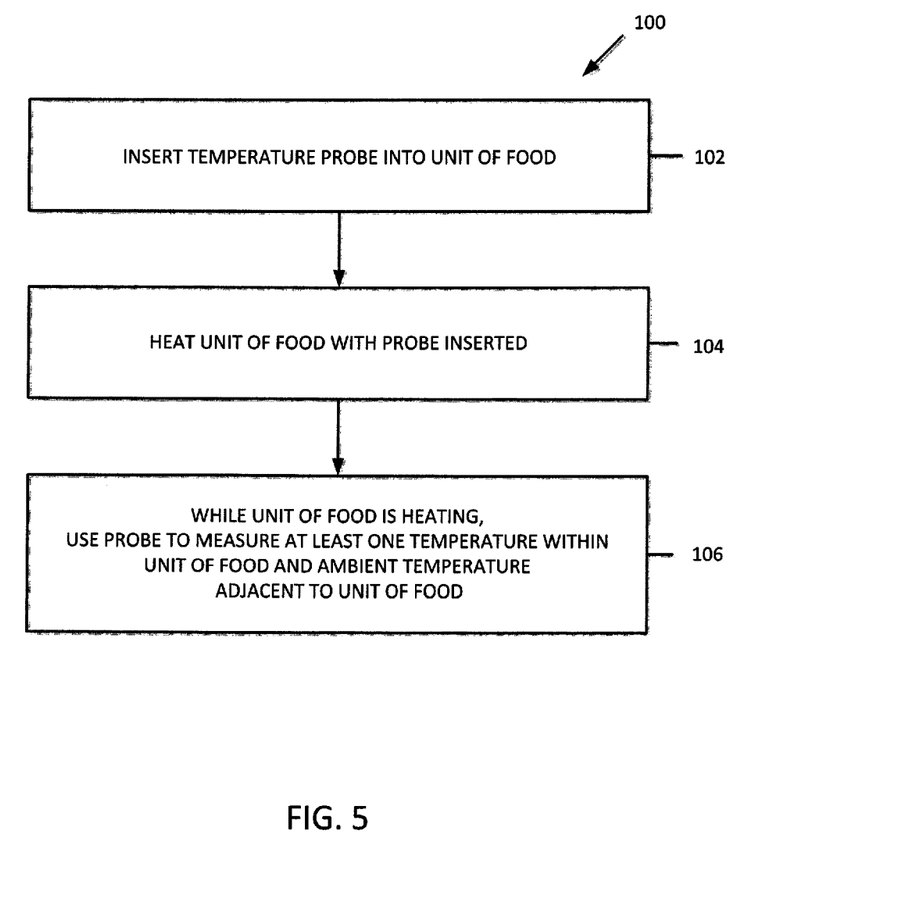
FIGS. 5 and 6 are flowcharts illustrating exemplary methods disclosed herein.

An exemplary method 100 of measuring temperatures is illustrated in FIG. 5. At 102, a probe is inserted into a unit of food. At 104, the unit of food is heated with the probe inserted. And at 106, the probe is used to measure at least one temperature within the unit of food and an ambient temperature adjacent to the unit of food, while unit of food is heating. In some embodiments, temperature is measured at two or more different locations within the unit of food with the probe, simultaneously with the ambient temperature, while the loaf is heating. The temperatures can be measured at a plurality of times throughout the heating process and recorded in correlation with the times when the measurements were taken.

The probe 10 can be used in a system with other components to measure and record temperatures within a unit of food 12 while the unit of food is being heated and/or to measure and record ambient temperature adjacent to the unit of food while the unit of food is being heated. In one exemplary embodiment, illustrated in FIGS. 1 and 2, the probe 10 is used with a loaf of bread 12 that moves through an oven 14 in a baking pan 16 on a conveyor 18. Temperatures measured with the probe 10 can be transmitted to a receiver 20 that is electrically coupled to the probe and that moves through the oven 14 with the loaf 12 and the probe 10. The receiver 20 can store temperature and timing data received from the probe 10 (i.e., the receiver 20 can act as a data logger) and/or can wirelessly transmit the data to a location outside of the oven 14, such as to a computer configured to monitor baking temperatures. In other embodiments, the probe 10 and receiver 20 can be used to measure temperatures within and/or adjacent to a unit of food being heated in other types of heating devices, such as a conventional batch oven having a single set temperature.

Figure 1:
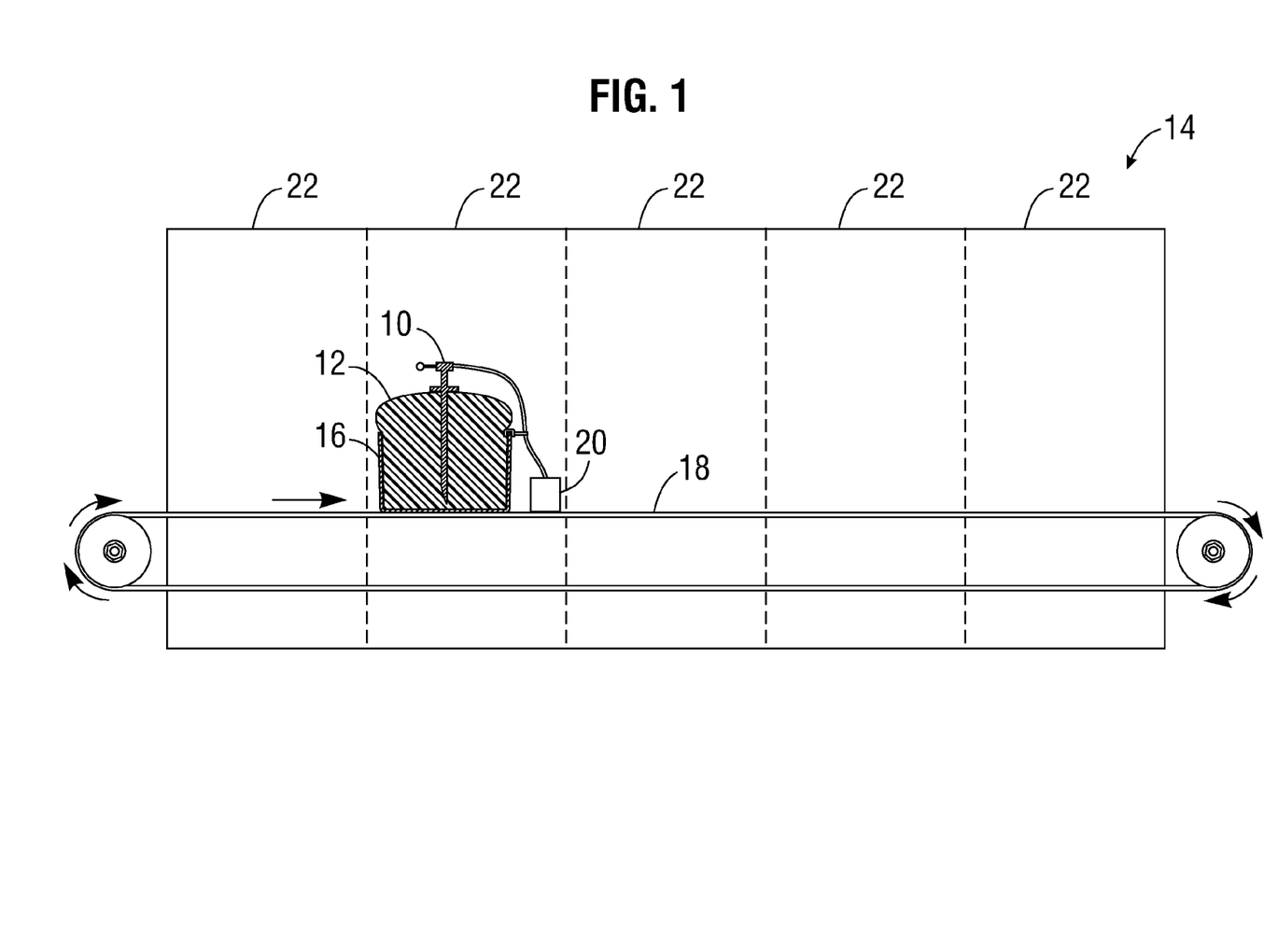
FIG. 1 is a side view of a loaf moving through an oven on a conveyor with an exemplary temperature probe inserted into the loaf.
Figure 2:
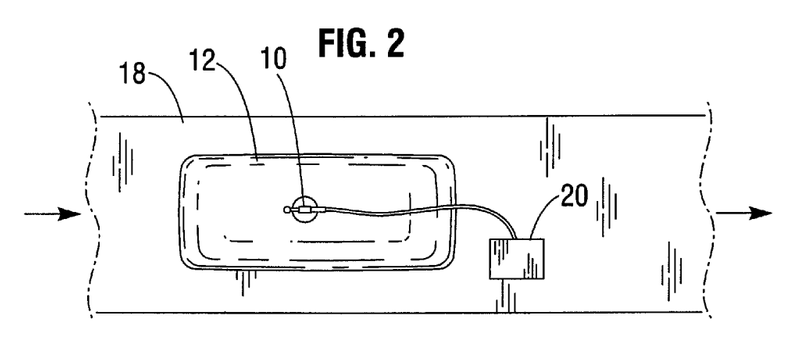
FIG. 2 is a top view of the loaf and probe of FIG. 1.

The oven 14 can comprise a plurality of temperature zones 22, and each zone can be independently adjusted to different air temperatures to accomplish different stages of the baking, such as yeast-kill and gelatinization. Using the probe 10, one or more temperatures within the loaf 12 can be measured simultaneously with the temperature of the oven air temperature at time intervals throughout the baking process. The measured temperatures can be recorded and then reviewed later to analyze the baking process and/or the measured temperatures can be transmitted live to a monitor or computer outside of the oven 14 and analyzed live during the baking process. In some embodiments, based on the measured temperatures, adjustments to the oven air temperatures in one or more of the different temperature zones 22 can be made to affect the baking characteristics of the loaf 12.

Figure 3:
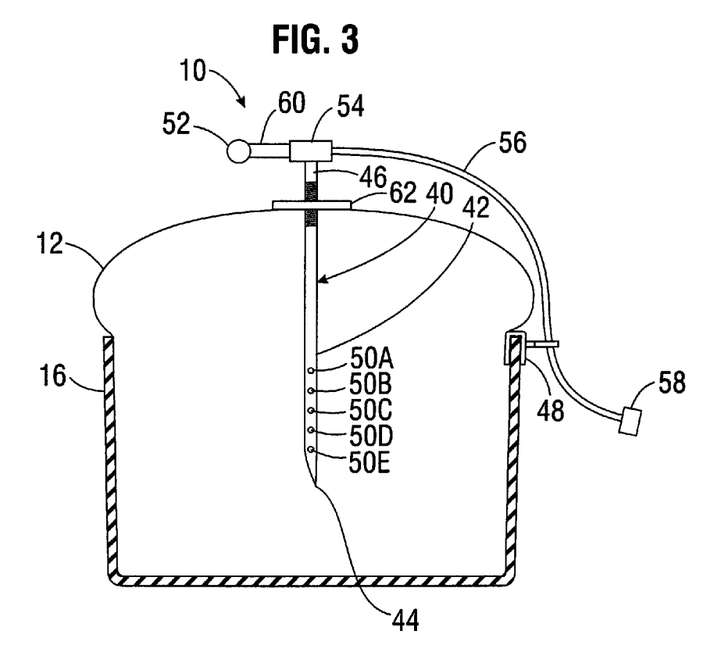
FIG. 3 is cut away side view of a loaf with an exemplary temperature probe inserted into the loaf.

As shown in FIG. 3, the probe 10 comprises a narrow, elongated, hollow shaft 40 that comprises a first portion 42 with a pointed end 44 that is configured to be inserted into a unit of food 12, and a second portion 46 that is configured to extend outside of the unit of food. The probe 10 further comprises at least two temperature sensors 50 positioned at different longitudinal locations along the first portion 42 of the shaft for measuring temperatures within the unit of food 12 and at least one ambient temperature sensor 52 coupled to the second portion 46 of the shaft for measuring ambient temperature adjacent to the unit of food 12. In an alternative embodiment, the shaft can be filled, such as with insulation or a sealant, with the temperature sensors 50 embedded therein or attached thereto. The temperature sensors 50 and 52 can comprise any suitable device configured to sense temperature, such as a thermocouple, a thermistor, an RTD, etc.

Each of the temperature sensors 50 and 52 can be coupled to, or include, a pair of insulated electrical wires. The wires for the temperature sensors 50 in the shaft 40 can run along the length of the shaft lumen to a transition portion 54 coupled to the top end of the shaft and then through a cable 56 to an adaptor 58 for coupling to additional components, such as the receiver 20. The wires for the ambient temperature sensor 52 can pass through a thermal insulation component 60, join the other wires in the transition portion 54, and continue through the cable 56 to the adaptor 58. The transition portion 54 can route the temperature sensor wires out of the probe in a direction generally parallel to the insertion surface of the unit of food and generally perpendicular to the shaft 40. The cable 56 can be held to the pan 16 with a clip 48 such that tension on the cable is transferred to the pan rather than to the probe 10, reducing the chance of the cable pulling on the probe, which can damage the unit of food 12 and/or displace the probe relative to the unit of food.

The probe 10 can further comprise a stop 62 coupled to the shaft 40. The stop 62 can delineate the first portion 42 from the second portion 46. Upon insertion of the probe into a unit of food 12, the stop can limit the insertion depth of the shaft 40 by abutting the insertion surface of the unit of food. In some embodiments, the stop 62 can be adjustable along the length of the shaft 40 in order to change the insertion depth of the shaft 40. A shown in FIG. 4, some embodiments of the probe 10 can comprise a shaft 40 with an externally threaded portion 64. The stop 62 can also be internally threaded such that the longitudinal position of the stop relative to the shaft 40 can be adjusted by rotating the stop relative to the shaft. Other known mechanical adjustment mechanisms can also be used to make the stop 62 longitudinally adjustable. The stop 62 can be moved toward the pointed end 44 of the shaft to reduce the insertion depth, such as for shallow loaves, and the stop can be moved toward the transition portion 54 to increase the insertion depth, such as for deeper loaves. In some embodiments, the shaft 40 can be made longer or shorted to adjust the insertion depth of the shaft into the loaf.

Figure 4:
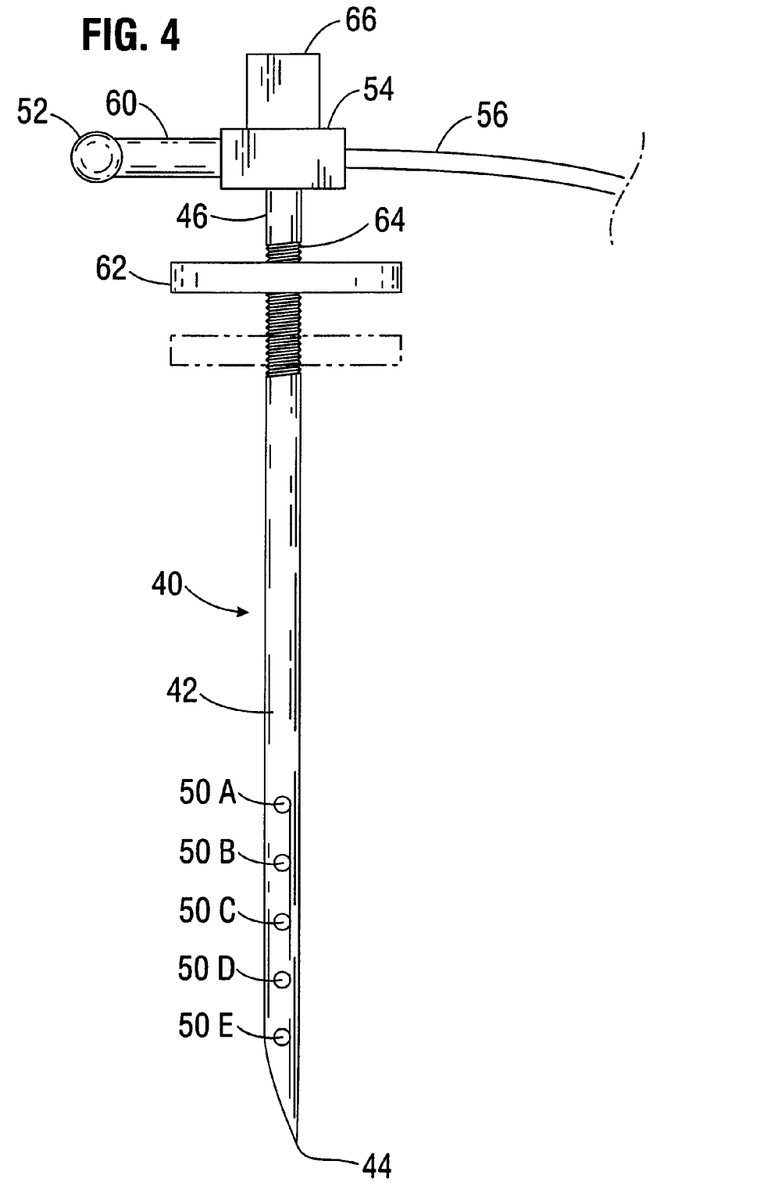
FIG. 4 is side view of an exemplary temperature probe with an adjustable stop.

As shown in FIG. 4, the probe 10 can further comprise a gripping portion 66 at the top of the probe. A user can grip the gripping portion 66 to insert and/or remove the probe from a unit of food. In the embodiment shown in FIG. 4, the gripping portion 66 comprises a tab that projects upward from the transition portion 54. In other embodiments, the gripping portion 66 can comprise covering that encases the transition portion 54, part of the shaft 46, and/or the stop 62. The gripping portion 66 can be made of a high-temperature silicone material.

The ambient temperature sensor 52 can be thermally insulated from the shaft 40 and the transition portion 54 with the thermal insulation portion 60 (see FIG. 3) to reduce heat transfer to and/or from the unit of food 12 via the shaft and the transition portion. The insulation portion 60 can be positioned between the temperature sensor 52 and the transition portion 54 and can comprise any suitable thermal insulation material.

The probe 10 can comprise a plurality of temperature sensors 50 at different longitudinal positions along the insertion portion 42 of the shaft 40. Some embodiments of the probe can comprise three or more, four or more, and/or five or more temperature sensors 50 at different longitudinal positions along the shaft 40. In the embodiment shown in FIG. 3, the probe 10 comprises five temperature sensors 50 at spaced apart increments along the shaft 40. The five temperature sensors are labeled A-E, with A being farthest from the insertion point 44 and E being closest to the insertion point. The temperature sensors A-E can be evenly spaced apart from one another, or at different intervals.

In some embodiments, the temperature sensors 50 can be enclosed within the lumen of the shaft 40 and can measure heat that is conducted radially through the outer wall of the shaft. In other embodiments, the shaft 40 can comprise openings through which the temperature sensors 50 protrude such that they can directly contact the unit of food 12.

The location and depth that the shaft 40 is inserted into the unit of food 12 can be selected to position at least one of the temperature sensors 50 at or near the slowest-heating portion of the unit of food, which is typically the center of the unit of food. When a unit of food is being heated, the slowest-heating portion can also be the coolest portion. However, as the unit of food is heated, the unit of food can expand and change shape, making placing or maintaining a single temperature sensor at the center of the unit of food difficult and inaccurate. Including multiple temperature sensors 50 in the shaft 40 at different longitudinal positions can increase the likelihood of finding and measuring the slowest-heating portion of the unit of food 12 on a repeatable basis.

From the five different temperature reading locations inside the unit of food corresponding to temperature sensors A-E, as in the example shown in FIG. 3, the coolest temperature of the five measured temperatures can be determined at any given point in time during the heating process. The determined coolest temperature can represent the slowest-heating portion in the unit of food. Desirably, the middle temperature sensor C is positioned at the slowest-heating portion of the unit of food, and the temperatures at the other four locations A, B, D and E are higher than at C. However, even if the probe 10 stop is not accurately adjusted for a given unit of food or if the probe is inserted incorrectly, one of the other temperature sensors A, B, D or E can still be positioned adjacent to the slowest-heating portion of the unit of food and can provide an accurate reading.

Figure 6:
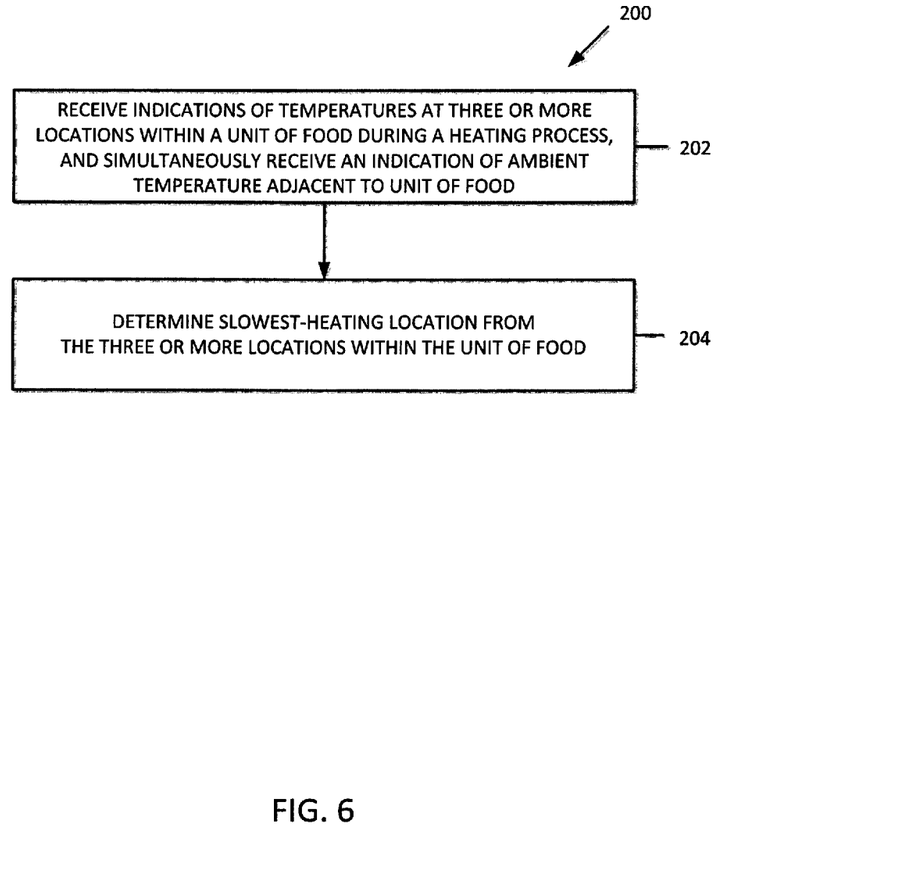

FIG. 6 illustrates an exemplary method 200 for monitoring temperatures during baking heating process. At 202, indications of temperatures at three or more locations within a heating unit of food can be received, and simultaneously an indication of ambient temperature adjacent to the unit of food can be received. At 204, the slowest-heating location from among the three of more locations within the unit of food can be determined. The method 200 can further comprise determining, based on the received indications, one or more times and/or temperatures related to the heating process. For example, the method 200 can further comprise determining one or more of the following: the temperature at the slowest-heating location within the unit of food at the start of the heating process; a time from the start of the heating process until the temperature at the slowest-heating location reaches a first predetermined temperature threshold, such as a yeast-kill temperature; a time from the start of the heating process until the temperature at the slowest-heating portion reaches a second predetermined temperature threshold, such as a gelatinization temperature; a time from the start of the heating process until an end of the heating process; and a temperature at the slowest-heating location at the end of the heating process. The determined times can be expressed in terms of a percentage of the entire heating process time.

If the coolest temperature reading from among the five locations A-E is at one of the intermediate locations B-D, for example, then the higher temperatures at the locations A and E can indicate that the slowest-heating portion of the unit of food is likely being measured. Conversely, if the coolest temperature reading is at location A or E, that can indicate that the coolest portion of the unit of food may not be being measured and that the probe may need to be adjusted to a different depth.

Furthermore, the gradient of temperatures measured over the locations A-E, especially when compared at different times during the heating process, can be used to determine if the unit of food was heated too quickly or too slowly. For example, if the rate of change of temperatures over the locations A-E is overly gradual or overly sharp, that can indicate the ambient temperature is too low or too high (such as in a particular temperature zone 22) and that the ambient temperature may need to be adjusted.

The ambient temperature sensor 52 can be used to measure the ambient temperature adjacent to the unit of food 14 during the heating process. This ambient temperature measurement can be correlated with the simultaneous temperatures within the unit of food and/or a time from the start of the heating process at each reading instance.

In the case of baking a loaf of bread on a conveyor 18, as shown in FIGS. 1 and 2, the location of the loaf within the oven can be determined from the ambient oven air temperature, and, thus, the temperatures within the loaf can be correlated with the location of the loaf within the oven. For example, after a loaf is baked and the temperatures have been measured and recorded at a predetermined time interval during baking, each set of temperature measurements can be correlated to a specific location along the conveyor 18 and a specific temperature zone 22 in the oven 14. Based on the recorded temperatures, adjustments to the conveyer speed and/or baking temperatures can be made. For example, if the slowest-heating portion of the loaf 12 is getting too hot in a particular temperature zone 22, the oven temperature can be reduced at that zone and/or the conveyor speed can be increased such that the loaf does not bake as long in that zone.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A temperature probe comprising:
   an elongated shaft comprising a first portion and a second portion, the first portion being configured for insertion into a unit of food, the second portion being configured to extend outside of the unit of food;
   at least two temperature sensors positioned at different longitudinal locations along the first portion of the shaft, the temperature sensors being configured to measure temperature of the unit of food at different locations within the unit of food; and
   at least one ambient temperature sensor coupled to the second portion of the shaft and configured to measure ambient temperature adjacent to the unit of food;
   wherein the at least one ambient temperature sensor is thermally insulated from the shaft.

2. The probe of claim 1, further comprising a stop coupled to the shaft between the first portion and the second portion, the stop being configured to rest on a surface of the unit of food upon insertion of the first portion of the shaft into the unit of food in order to limit further insertion of the shaft into the unit of food.

3. The probe of claim 2, wherein the stop is adjustable along the longitudinal length of the shaft, such that a distance between the stop and the temperature sensors can be adjusted.

4. The probe of claim 1, wherein the at least two temperature sensors comprise three or more temperature sensors positioned at different longitudinal locations along the first portion of the shaft.

5. The probe of claim 4, wherein the first portion of the shaft is configured to be positioned within the unit of food such that a middle one of the different longitudinal locations is at a slowest-heating portion of the unit of food.

6. The probe of claim 1, wherein the at least two temperature sensors are configured to measure temperature at or near a slowest-heating portion of the unit of food.

7. The probe of claim 1, wherein the probe is electrically connected to a data logger, the probe and the data logger being positioned within a heating device.

8. The probe of claim 7, wherein the data logger is configured to wirelessly transmit temperature data from within the heating device to a location outside the heating device.

9. The probe of claim 1, further comprising a thermal insulation component having a first end portion coupled to the second portion of the shaft and a second end portion extending from the shaft in a direction not parallel with a longitudinal direction of the shaft, wherein the ambient temperature sensor is coupled to the second end portion of the thermal insulation component.

10. The probe of claim 9, further comprising a transition portion coupled to the second portion of the shaft, wherein the first end portion of the thermal insulation portion is coupled to the transition portion, and wherein a wire from the ambient temperature sensor passes through the thermal insulation portion, through the transition portion, and extends from the transition portion in a direction not parallel with the longitudinal direction of the shaft.

11. The probe of claim 1, further comprising a transition portion coupled to the second portion of the shaft, wherein wires from the temperature sensors pass through the transition portion and extend from the transition portion in a direction generally perpendicular to the longitudinal direction of the shaft.

12. A method of measuring temperature, comprising:
    inserting a temperature probe into a unit of food;
    heating the unit of food with the probe inserted;
    while the unit of food is heating, using the probe to measure at least one temperature within the unit of food and an ambient temperature adjacent to the unit of food; and
    wirelessly transmitting the measured temperatures from within a heating device to a location outside the heating device.

13. The method of claim 10, wherein detecting at least one temperature within the unit of food comprises:
    measuring, with the probe, internal temperatures of the unit of food at three or more longitudinally aligned locations within the unit of food; and
    determining a slowest-heating location of the three or more measured locations within the unit of food.

14. The method of claim 10, further comprising: storing the measured temperatures in correlation with time.

15. The method of claim 10, wherein the probe comprises an elongated hollow shaft and a plurality of thermocouples running through the shaft and terminating at different longitudinal locations within the shaft.

16. A method of measuring temperature, comprising:
    inserting a temperature probe into a unit of food;
    heating the unit of food with the probe inserted;
    while the unit of food is heating, using the probe to measure at least one temperature within the unit of food and an ambient temperature adjacent to the unit of food;
    wherein heating the unit of food comprises: moving the unit of food and the inserted probe through a plurality of different temperature zones using a conveyor, the ambient temperature being different in the different temperature zones; and
    the method further comprises determining which temperature zone the unit of food is in based on the measured ambient temperature.

17. A method for measuring temperatures, the method comprising:
    receiving indications of temperatures at three or more locations within a unit of food during a heating process occurring within an oven, and simultaneously receiving an indication of an ambient air temperature within the oven adjacent to the unit of food, wherein the indications of temperatures are received wirelessly outside of the oven from a transmitter located within the oven; and
    determining a slowest-heating location from among the three or more locations within the unit of food.

18. The method of claim 17, wherein the slowest-heating location is between at least two of the other locations within the unit of food.

19. The method of claim 17, further comprising, based on the received indications:
    determining the temperature at the slowest-heating location at a start of the heating process;
    determining a time from the start of the heating process until the temperature at the slowest-heating location reaches a yeast-kill temperature;
    determining a time from the start of the heating process until the temperature at the slowest-heating location reaches a gelatinization temperature;
    determining a time from the start of the heating process until an end of the heating process; and
    determining a temperature at the slowest-heating location at the end of the heating process.

20. A method for measuring temperatures, the method comprising:
    receiving indications of temperatures at three or more locations within a unit of food during a heating process, and simultaneously receiving an indication of an ambient temperature adjacent to the unit of food;

determining a slowest-heating location from among the three or more locations within the unit of food; and determining a section of an oven in which the unit of food is located based on the ambient temperature adjacent to the unit of food.

\* \* \* \* \*

UNITED STATES PATENT AND TRADEMARK OFFICE
CERTIFICATE OF CORRECTION

| | | |
|---|---|---|
| PATENT NO. | : 8,556,502 B2 | Page 1 of 1 |
| APPLICATION NO. | : 13/302969 | |
| DATED | : October 15, 2013 | |
| INVENTOR(S) | : Austen et al. | |

It is certified that error appears in the above-identified patent and that said Letters Patent is hereby corrected as shown below:

In the Claims:

Column 8, line 7, "The method of claim 10," should read --The method of claim 12,--

Column 8, line 14, "The method of claim 10," should read --The method of claim 12,--

Column 8, line 16, "The method of claim 10," should read --The method of claim 12,--

Signed and Sealed this
First Day of March, 2016

Michelle K. Lee
*Director of the United States Patent and Trademark Office*